(12) United States Patent
Masuda (10) Patent No.: US 9,797,462 B2
(45) Date of Patent: Oct. 24, 2017

(54) ELECTRIC LINEAR MOTION ACTUATOR AND ELECTRIC BRAKE SYSTEM

(71) Applicant: NTN CORPORATION, Osaka (JP)

(72) Inventor: Yui Masuda, Shizuoka (JP)

(73) Assignee: NTN CORPORATION, Osaka (JP)

( * ) Notice: Subject to any disclaimer, the term of this patent is extended or adjusted under 35 U.S.C. 154(b) by 43 days.

(21) Appl. No.: 14/889,872

(22) PCT Filed: May 2, 2014

(86) PCT No.: PCT/JP2014/062153
§ 371 (c)(1),
(2) Date: Nov. 9, 2015

(87) PCT Pub. No.: WO2014/185292
PCT Pub. Date: Nov. 20, 2014

(65) Prior Publication Data
US 2016/0091039 A1    Mar. 31, 2016

(30) Foreign Application Priority Data

May 17, 2013   (JP) .................................. 2013-105153

(51) Int. Cl.
*B60T 13/74*    (2006.01)
*F16D 65/18*    (2006.01)
(Continued)

(52) U.S. Cl.
CPC ............ *F16D 65/18* (2013.01); *B60T 13/741* (2013.01); *F16D 55/225* (2013.01); *H02P 7/285* (2013.01);
(Continued)

(58) Field of Classification Search
CPC ............ F16D 2121/24; F16D 2125/50; F16D 2125/40
See application file for complete search history.

(56) References Cited

U.S. PATENT DOCUMENTS 5,496,097 A    3/1996   Eckert
6,435,625 B1   8/2002   Schwarz et al.
(Continued)

FOREIGN PATENT DOCUMENTS

JP    06-344875     12/1994
JP    2000-016279   1/2000
(Continued)

OTHER PUBLICATIONS

International Search Report issued Jul. 22, 2014 in International (PCT) Application No. PCT/JP2014/062153.

*Primary Examiner* — Bradley King
(74) *Attorney, Agent, or Firm* — Wenderoth, Lind & Ponack, L.L.P.

(57) ABSTRACT

An electric linear motion actuator includes an electric motor, a motion conversion mechanism for converting the torque of the electric motor to the linear driving force of an outer ring member, a load sensor, and a motor control device. The motor control device is configured to control the electric current applied to the electric motor such that the torque of the electric motor increases until the pressing force detected by the load sensor exceeds a target value, and then the torque of the electric motor decreases until the pressing force detected by the load sensor reaches the target value.

18 Claims, 9 Drawing Sheets

(51) Int. Cl.
*F16D 55/225* (2006.01)
*H02P 7/285* (2016.01)
*F16D 121/24* (2012.01)
*F16D 125/40* (2012.01)
*F16D 125/48* (2012.01)
*F16D 125/50* (2012.01)
*F16H 25/20* (2006.01)

(52) U.S. Cl.
CPC ...... *F16D 2121/24* (2013.01); *F16D 2125/40* (2013.01); *F16D 2125/48* (2013.01); *F16D 2125/50* (2013.01); *F16H 25/2021* (2013.01)

(56) References Cited

U.S. PATENT DOCUMENTS

| | | | |
|---|---|---|---|
| 7,104,616 B2* | 9/2006 | Zierolf | B60T 8/1703 188/181 T |
| 7,140,697 B2* | 11/2006 | Koga | B60T 7/107 188/156 |
| 8,985,284 B2* | 3/2015 | Ito | B60T 13/588 188/71.8 |
| 2005/0046368 A1* | 3/2005 | Arakawa | B60T 13/741 318/370 |
| 2008/0071457 A1* | 3/2008 | Shiraki | B60T 7/122 701/70 |
| 2009/0281702 A1* | 11/2009 | Cahill | F16D 66/025 701/78 |
| 2010/0308645 A1* | 12/2010 | Maron | B60T 13/588 303/20 |
| 2013/0048443 A1 | 2/2013 | Muramatsu et al. | |
| 2014/0283635 A1 | 9/2014 | Masuda et al. | |
| 2015/0360656 A1* | 12/2015 | Masuda | B60T 7/042 188/162 |
| 2016/0031427 A1* | 2/2016 | Yasui | B60T 17/22 701/70 |

FOREIGN PATENT DOCUMENTS

| | | |
|---|---|---|
| JP | 2002-104169 | 4/2002 |
| JP | 2003-522060 | 7/2003 |
| JP | 2009-220807 | 10/2009 |
| JP | 2011-241851 | 12/2011 |
| JP | 2013-083550 | 5/2013 |

* cited by examiner

ELECTRIC LINEAR MOTION ACTUATOR AND ELECTRIC BRAKE SYSTEM

TECHNICAL FIELD

The present invention relates to an electric linear motion actuator including a motion conversion mechanism configured to convert the torque generated in an electric motor to a linear motion force such that a pressing force is applied to a target member by the linear motion force, and to an electric brake system in which this electric linear motion actuator is used.

BACKGROUND ART

As brake systems for a vehicle, hydraulic brake systems have been used in which a friction pad is pressed against a brake disk by a hydraulic cylinder so as to generate braking force. However, in recent years, with the introduction of brake control such as anti-lock brake system (ABS), electric brake systems in which no hydraulic circuit is used are gathering attention.

Electric brake systems include an electric linear motion actuator provided with an electric motor as a driving source, and a friction pad is pressed against a brake disk by this electric linear motion actuator so as to generate braking force.

As such an electric brake system, the electric brake system, for example, disclosed in Japanese Application Publication 2011-241851 is known. This publication discloses an electric linear motion actuator by which a friction pad is pressed against a brake disk. This electric linear motion actuator includes an electric motor, a motion conversion mechanism for converting the torque generated in the electric motor to the linear driving force of a linear motion member such that the friction pad is pressed against the brake disk by the linear motion member, and a load sensor configured to detect the magnitude of the pressing force applied to the brake disk. The torque of the electric motor is controlled on the basis of the magnitude of the pressing force detected by the load sensor.

If the electric linear motion actuator of the JP 2011-241851 publication is used, by continuing to apply constant electric current to the electric motor, it is possible to maintain the pressing force applied to the brake disk from the linear motion member. If the electric current applied to the electric motor at this time can be reduced, it is possible to effectively reduce the power consumption of the electric motor.

In a motion conversion mechanism for converting the torque of an electric motor to the linear driving force of a linear motion member, and a pressing force is applied to a target member by the linear motion member, large frictional forces occur in the motion conversion mechanism due to the reaction force which acts on the linear motion member from the target member. Such frictional forces cause energy loss, and thus are generally undesirable.

SUMMARY OF THE INVENTION

It is an object of the present invention to provide an electric linear motion actuator whose power consumption (and energy loss) is low.

In order to reduce the power consumption of an electric linear motion actuator, the inventor of the present invention focused on the point that the above frictional forces generally considered to be undesirable might be able to be used for maintain a pressing force. When the pressing force applied to a target member from a linear motion member changes, hysteresis tends to occur in a motion conversion mechanism for converting the torque of an electric motor to the linear motion force of the linear motion member such that a pressing force is applied to the target member from the linear motion member. Hysteresis is a phenomenon in which when the pressing force applied to the target member from the linear motion member while the torque of the electric motor is increasing is identical in magnitude to the pressing force while the torque of the electric motor is decreasing, the torque of the electric motor necessary to generate the former pressing force is not identical in magnitude to, but is larger in magnitude than, the torque necessary to generate the latter pressing force. Such hysteresis mainly arises from the frictional forces generated in the motion conversion mechanism. The inventor of the present invention noticed that it might be possible to reduce the power consumption of the electric motor by controlling the electric current to the electric motor taking this hysteresis of the motion conversion mechanism into account.

On the basis of the above point, the inventor of the present invention used an electric linear motion actuator comprising: an electric motor capable of generating a torque corresponding to a driving electric current applied to the electric motor; a motion conversion mechanism configured to convert the torque generated by the electric motor to a linear driving force of a linear motion member such that a pressing force is applied to a target member from the linear motion member; a load sensor configured to detect a magnitude of the pressing force applied to the target member; and a motor control device configured to control the driving electric current applied to the electric motor on a basis of the magnitude of the pressing force detected by the load sensor. The motion conversion mechanism comprises a mechanism showing a hysteresis property by which a magnitude of the torque of the electric motor when the pressing force is of any arbitrary magnitude while the torque is increasing is not identical to, but is larger than, a magnitude of the torque when the pressing force is of the arbitrary magnitude while the torque is decreasing. The motor control device is configured to control the electric current applied to the electric motor when the pressing force applied to the target member is to be maintained, such that the torque of the electric motor increases until the pressing force, as detected by the load sensor, reaches a predetermined value larger than a target value. Then the torque of the electric motor decreases until the pressing force, as detected by the load sensor, reaches the target value.

In this arrangement, due to the hysteresis property of the motion conversion mechanism, the torque of the electric motor when the pressing force has reached the target value while the torque is decreasing is not identical in magnitude to, but is smaller in magnitude than, the torque of the electric motor when the pressing force has reached the same target value while the torque is increasing. The above motor control device is configured to control the electric current applied to the electric motor when the pressing force applied to the target member is to be maintained, such that the pressing force reaches the target value while the torque of the electric motor is decreasing. As a result thereof, it is possible to keep the torque of the electric motor small when the pressing force is at the target value, and thus to reduce the power consumption of the electric motor necessary for maintaining the pressing force thereafter.

The target value may comprise a load command value input to the motor control device from outside, and the predetermined value may comprise a value larger by a predetermined offset value than the load command value. Namely, the motor control device may comprise a device configured to control the electric current applied to the electric motor when the load command value is input to the motor control device from outside, such that, first, the torque of the electric motor increases until the pressing force detected by the load sensor reaches the value larger by the predetermined offset value than the load command value, second, the torque of the electric motor decreases until the pressing force detected by the load sensor reaches the load command value, and third, the torque of the electric motor is maintained.

The target value may comprise a value smaller by a predetermined offset value than a load command value input to the motor control device from outside, and the predetermined value may comprise the load command value. Namely, the motor control device may comprise a device configured to control the electric current applied to the electric motor when the load command value is input to the motor control device from outside, such that, first, the torque of the electric motor increases until the pressing force detected by the load sensor reaches the load command value, second, the torque of the electric motor decreases until the pressing force detected by the load sensor reaches the value smaller by the predetermined offset value than the load command value, and third, the torque of the electric motor is maintained.

The electric motor may comprise a rotatably supported rotor, and a stator by which torque is to be generated in the rotor. The rotor and the stator are configured such that, during one rotation of the rotor relative to the stator, the torque generated in the rotor becomes maximum at first rotation phases of the rotor, and the torque generated in the rotor becomes minimum at the second rotation phases which are alternate with the first rotation phases. Furthermore, a phase sensor configured to detect the rotation phase of the rotor may be provided. At this time, it is preferable that the motor control device is configured to control the driving electric current applied to the electric motor when the pressing force detected by the load sensor is maintained at the target value, such that the rotor stops at one of the first rotation phases closest to the rotation phase when the pressing force coincides with the target value. By controlling in this way, after pressing force is applied to the target member, it is possible to stably maintain the magnitude of this pressing force.

The above control by which the rotor is stopped at one of the first rotation phases may be performed only if the target value of the pressing force is larger than a predetermined threshold value. By doing so, even if the target value of the pressing force is relatively small, it is possible to obtain stable pressing force.

The motion conversion mechanism may comprise a planetary roller mechanism including: a rotary shaft to which the torque of the electric motor is to be input; a plurality of planetary rollers kept in rolling contact with the cylindrical surface of the outer periphery of the rotary shaft; and an outer ring member arranged so as to surround the planetary rollers. A helical rib is formed on an inner periphery of the outer ring member; and a helical groove or a circumferential groove is formed in an outer periphery of each of the planetary rollers such that the helical rib engages in the helical groove or the circumferential groove. In this arrangement, since the planetary roller mechanism functions as a speed reduction mechanism, the above hysteresis property is shown to a considerable degree in the planetary roller mechanism which is the motion conversion mechanism. As a result thereof, by applying the above control to the electric linear motion actuator in which the planetary roller mechanism is used, it is possible to effectively reduce the power consumption of the electric motor.

The present invention also provides an electric brake system comprising: a brake disk configured to rotate together with a wheel; a friction pad; and an electric linear motion actuator configured to press the friction pad against the brake disk. The electric linear motion actuator comprises the above electric linear motion, and the target member comprises the brake disk.

Effects of the Invention

In the electric linear motion actuator of the present invention, when the pressing force applied to the target member is to be maintained, since the electric current applied to the electric motor is controlled such that the pressing force reaches the target value while the torque of the electric motor is decreasing, the torque of the electric motor when the pressing force has reached the target value is small compared to the normal control by which the pressing force reaches the target value while the torque of the electric motor is increasing. Therefore, it is possible to reduce the electric current applied to the electric motor for maintaining the pressing force at the target value, and thus to reduce the power consumption of the electric motor.

DETAILED DESCRIPTION OF THE INVENTION

Figure 1:
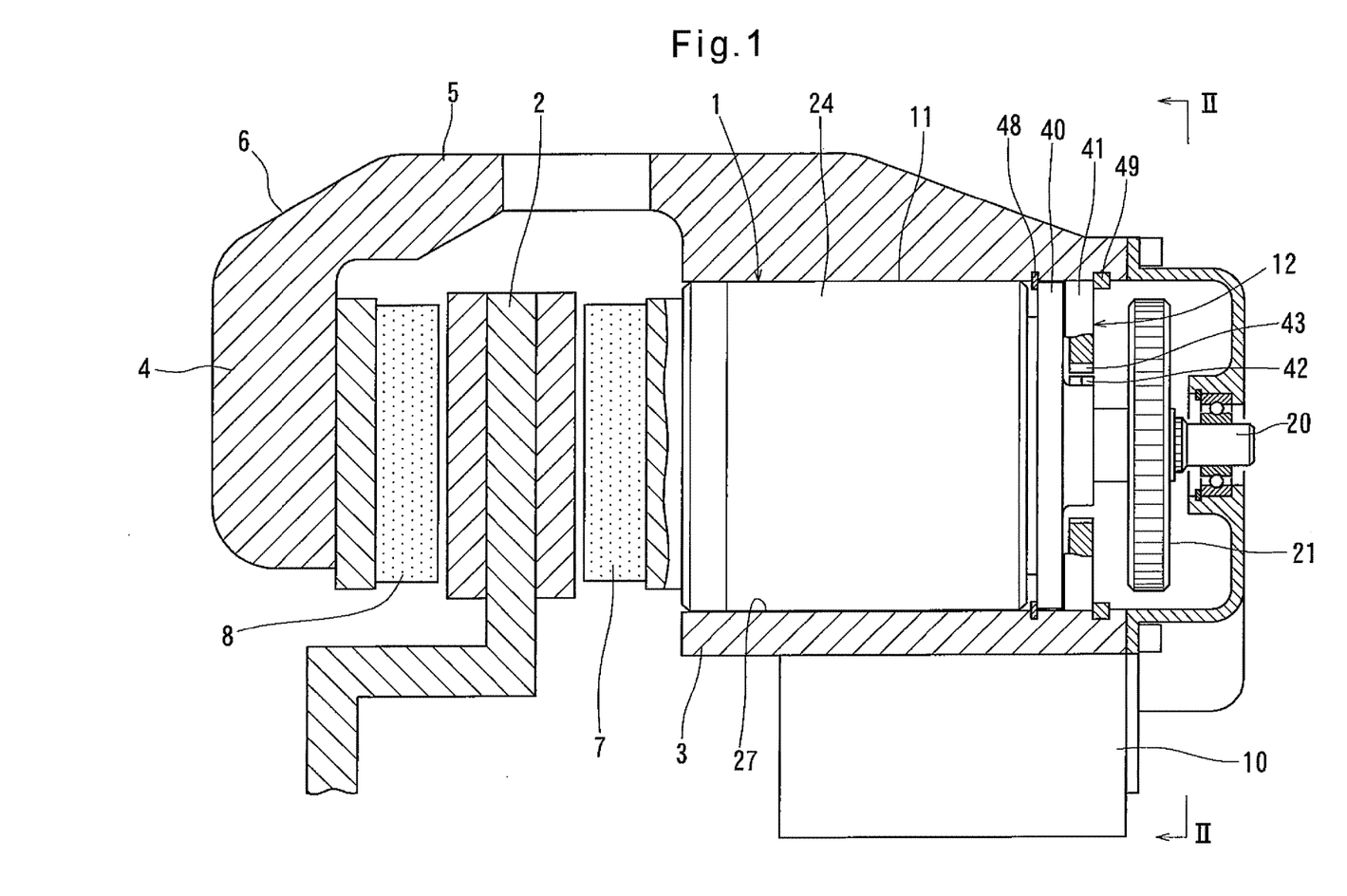
FIG. 1 is a sectional view of an electric brake system in which an electric linear motion actuator according to an embodiment of the present invention is incorporated.

FIG. 1 illustrates an electric brake system for a vehicle in which an electric linear motion actuator 1 according to the embodiment of the present invention is used.

The electric brake system includes a caliper body 6 having opposed pieces 3 and 4 coupled together through a bridge 5 so as to be opposed to each other through a brake disk 2 configured to rotate together with a wheel, a pair of right and left friction pads 7 and 8 arranged, respectively, between the opposed piece 3 and the brake disk 2 and between the opposed piece 4 and the brake disk 2, and the electric linear motion actuator 1, incorporated in the opposed piece 3.

The caliper body 6 is supported by a mount 9 (see FIG. 2) fixed to a knuckle (not shown) supporting the wheel so as to be slidable in the axial direction of the brake disk 2. The friction pads 7 and 8 are also supported so as to be movable in the axial direction of the brake disk 2.

As illustrated in FIG. 1, the electric linear motion actuator 1 includes an electric motor 10, a motion conversion mechanism 11 for converting the torque of the electric motor 10 to a linear driving force, and a load sensor 12 for detecting the magnitude of the pressing force applied to the brake disk 2.

Figure 3:
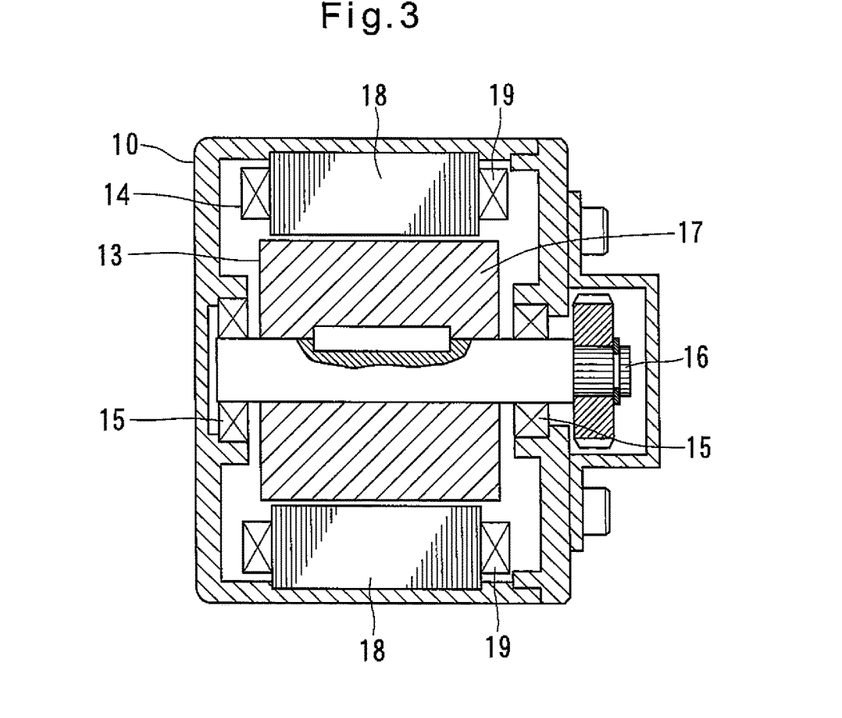
FIG. 3 is a sectional view taken along the line III-III of FIG. 2.

As illustrated in FIG. 3, the electric motor 10 includes a rotor 13 and a stator 14. The rotor 13 is constituted by a motor shaft 16 rotatably supported by bearings 15, and a rotor core 17 fixed to the motor shaft 16. The stator 14 includes a plurality of teeth 18 circumferentially equidistantly spaced apart from each other so as to surround the rotor core 17, and electromagnetic coils 19 wound around the respective teeth 18. The stator 14 generates torque in the rotor 13 due to the electromagnetic force generated between the teeth 18 and the rotor core 17 when the electromagnetic coils 19 are energized. The magnitude of the torque generated in the rotor core 13 at this time corresponds to the driving electric current flowing in the electromagnetic coils 19. Namely, the magnitude of the torque of the electric motor 10 is substantially proportional to the driving current flowing in the electromagnetic coils 19, so that as the electric current applied to the electromagnetic coils 19 monotonically increases, the torque generated in the rotor 13 monotonically increases.

During one rotation of the rotor 13 relative to the stator 14, the magnitude of the torque generated in the rotor 13 is not completely constant, but slightly increases and decreases according to the rotation phase of the rotor 13. Namely, during one rotation of the rotor 13 relative to the stator 14, as the rotor core 17 rotates relative to the teeth 18, the torque generated in the rotor 13 becomes maximum at first rotation phases of the rotor 13, and becomes minimum at second rotation phases of the rotor 13 which alternate with the first rotation phases.

Figure 2:
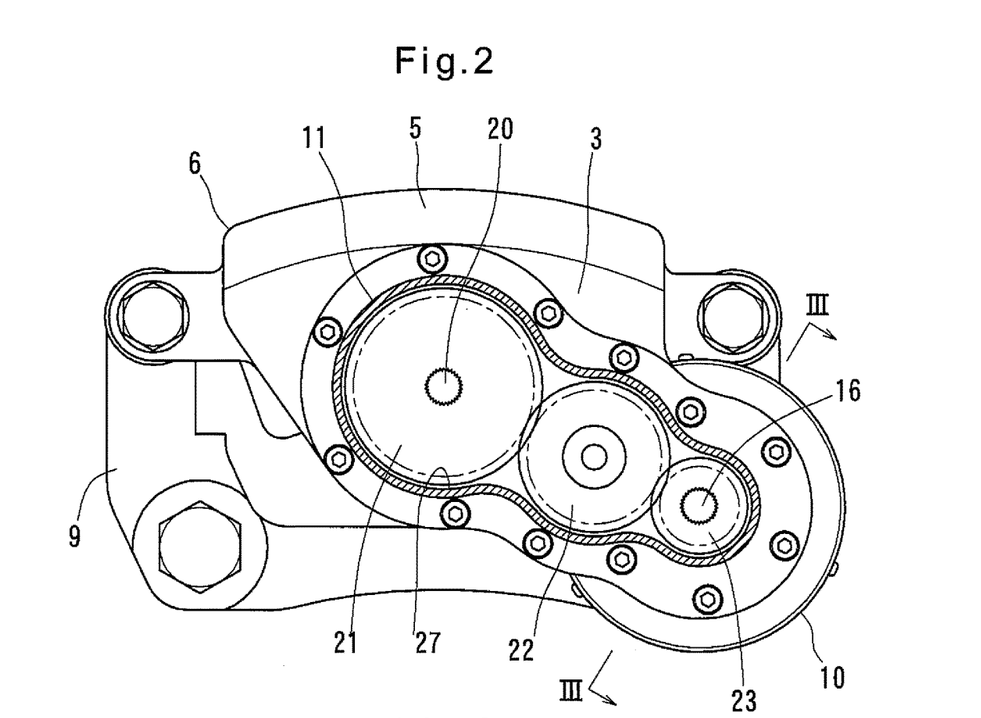
FIG. 2 is a sectional view taken along the line II-II of FIG. 1.

As illustrated in FIG. 2, the motion conversion mechanism 11 includes a rotary shaft 20 arranged so as to be parallel to the electric motor 10. A gear 21 is attached to the rotary shaft 20. Through a rotatably supported intermediate gear 22, the gear 21 meshes with a gear 23 attached to the motor shaft 16 of the electric motor 10. Therefore, the torque generated in the electric motor 10 is transmitted to the gear 23, the intermediate gear 22, and the gear 21 so as to be input to the rotary shaft 20.

Figure 4:
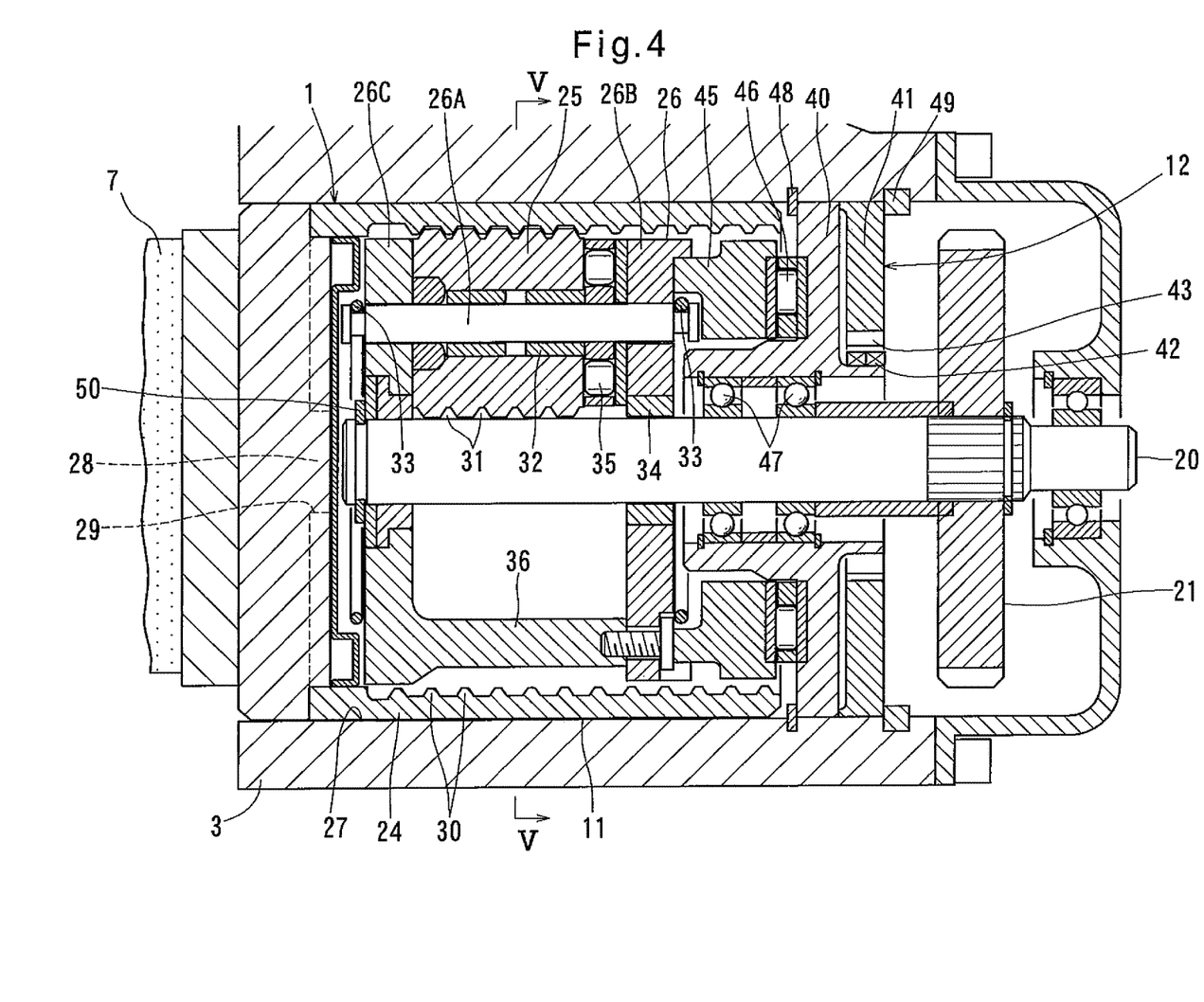
FIG. 4 is an enlarged sectional view of the electric linear motion actuator of FIG. 1.

As illustrated in FIG. 4, the motion conversion mechanism 11 includes, besides the rotary shaft 20, to which the torque of the electric motor 10 is input, an outer ring member 24 arranged coaxially with the rotary shaft 20 so as to surround the rotary shaft 20, a plurality of planetary rollers 25 kept in contact, from radially outward, with the outer periphery of the rotary shaft 20 and, from radially inward, with the inner periphery of the outer ring member 24, and a carrier 26 retaining the planetary rollers 25 such that the respective planetary rollers 25 are rotatable about their axes while revolving around the rotary shaft 20.

The outer ring member 24 is received in a receiving hole 27 formed in the opposed piece 3, and is axially movably supported by the inner surface of the receiving hole 27. An engagement rib 28 is formed at the axially front end of the outer ring member 24. The friction pad 7 is formed in its back surface with an engagement recess 29 in which the engagement rib 28 engages. The outer ring member 24 is rotationally fixed in position due to the engagement of the engagement rib 28 in the engagement recess 29.

Figure 5:
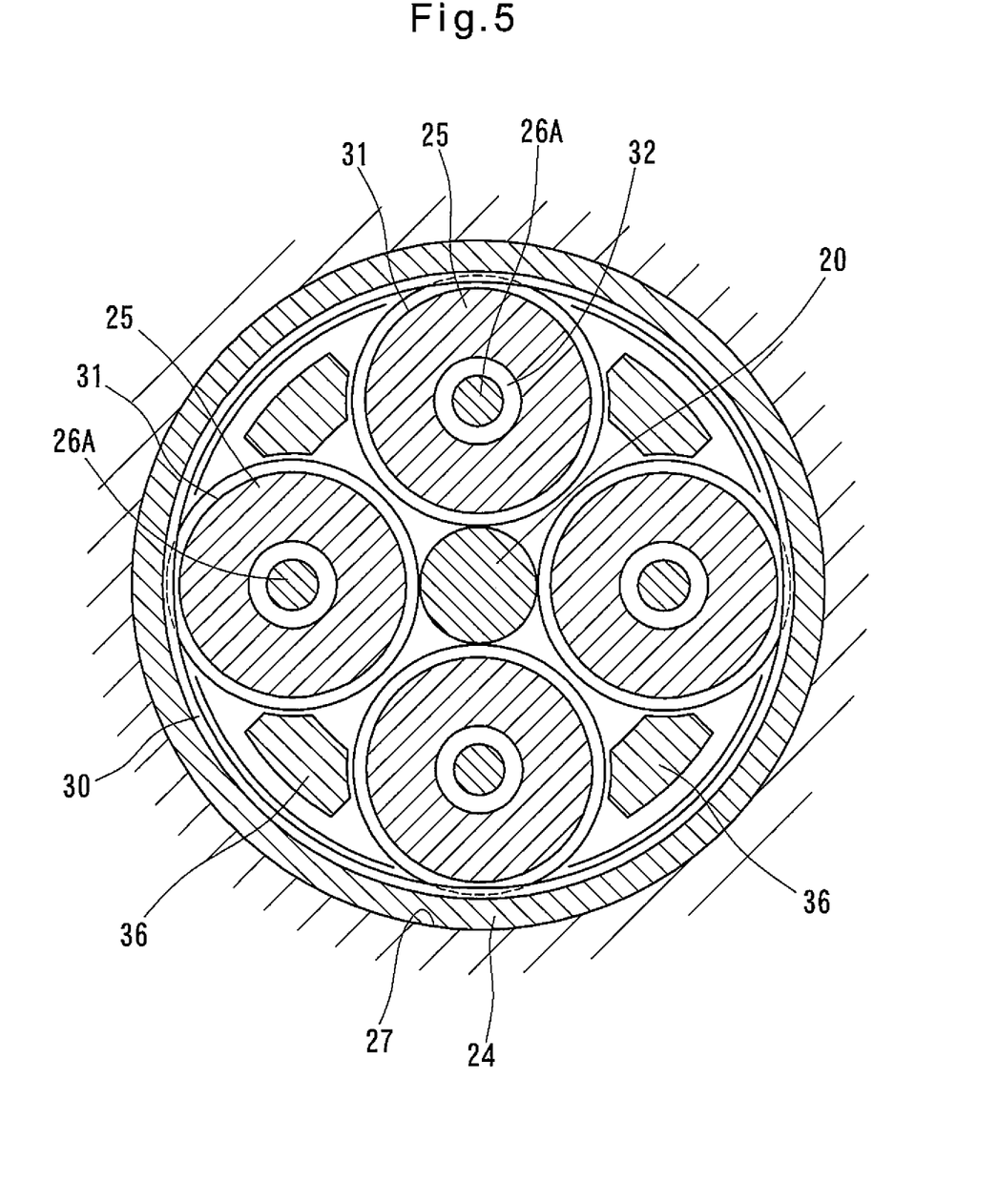
FIG. 5 is a sectional view taken along the line V-V of FIG. 4.

As illustrated in FIG. 5, the planetary rollers 25 are arranged so as to be circumferentially spaced apart from each other. The planetary rollers 25 are kept in rolling contact with the outer periphery of the rotary shaft 20 and the inner periphery of the outer ring member 24. The outer periphery of the rotary shaft 20 is a cylindrical surface. When the rotary shaft 20 rotates, the respective planetary rollers 25 rotate about their axes while revolving around the rotary shaft 20, between the rotary shaft 20 and the outer ring member 24. Namely, the respective planetary rollers 25 rotate about their axes under the rotational force transmitted from the outer periphery of the rotary shaft 20, and simultaneously revolve around the rotary shaft 20 by rolling on the inner periphery of the outer ring member 24.

The outer ring 24 is formed on its inner periphery with a helical rib 30. The helical rib 30 extends obliquely relative to the circumferential direction. Each planetary roller 25 is formed in its outer periphery with circumferential grooves 31 in which the helical rib 30 engages. When the planetary rollers 25 roll on the inner periphery of the outer ring member 24, the helical rib 30 is guided by the circumferential grooves 31 so that the outer ring member 24 and the planetary rollers 25 move in the axial direction relative to each other. Though, in this embodiment, the circumferential grooves 31, having a 0 degree lead angle, are formed on the outer periphery of each planetary roller 25, the circumferential grooves 31 may be replaced by a helical groove having a lead angle different from that of the helical rib 30.

As illustrated in FIG. 4, the carrier 26 includes a plurality of carrier pins 26A axially extending through the centers of the respective planetary rollers 25, an annular carrier plate 26C through which the axially front ends of the respective carrier pins 26A are coupled to each other, and an annular carrier body 26B through which the axially rear ends of the respective carrier pins 26A are coupled to each other. The carrier pins 26A support the respective planetary rollers 25 through bearings 32 such that the respective planetary rollers 25 are rotatable about their axes.

Radially compressible ring springs 33 are attached to both ends of the respective carrier pins 26A so as to be wrapped around all of the circumferentially spaced apart carrier pins 26A. The respective carrier pins 26A are radially inwardly biased by the radially compressible ring springs 33, and this biasing force presses the respective planetary rollers 25 against the outer periphery of the rotary shaft 20, thereby preventing the slippage between the rotary shaft 20 and the respective planetary rollers 25.

A slide bearing 34 is attached to the inner periphery of the carrier body 26B. The carrier body 26B is supported through the slide bearing 34 by the rotary shaft 20 so as to be rotatable relative to the rotary shaft 20. Thrust bearings 35 are incorporated between the carrier body 26B and the respective planetary rollers 25 to support the respective planetary rollers 25 so as to be rotatable about their axes. The carrier plate 26C and the carrier body 26B are coupled to each other through coupling rods 36 axially extending between the respective adjacent planetary rollers 25 so that the carrier plate 26C and the carrier body 26B rotate together.

Figure 6:
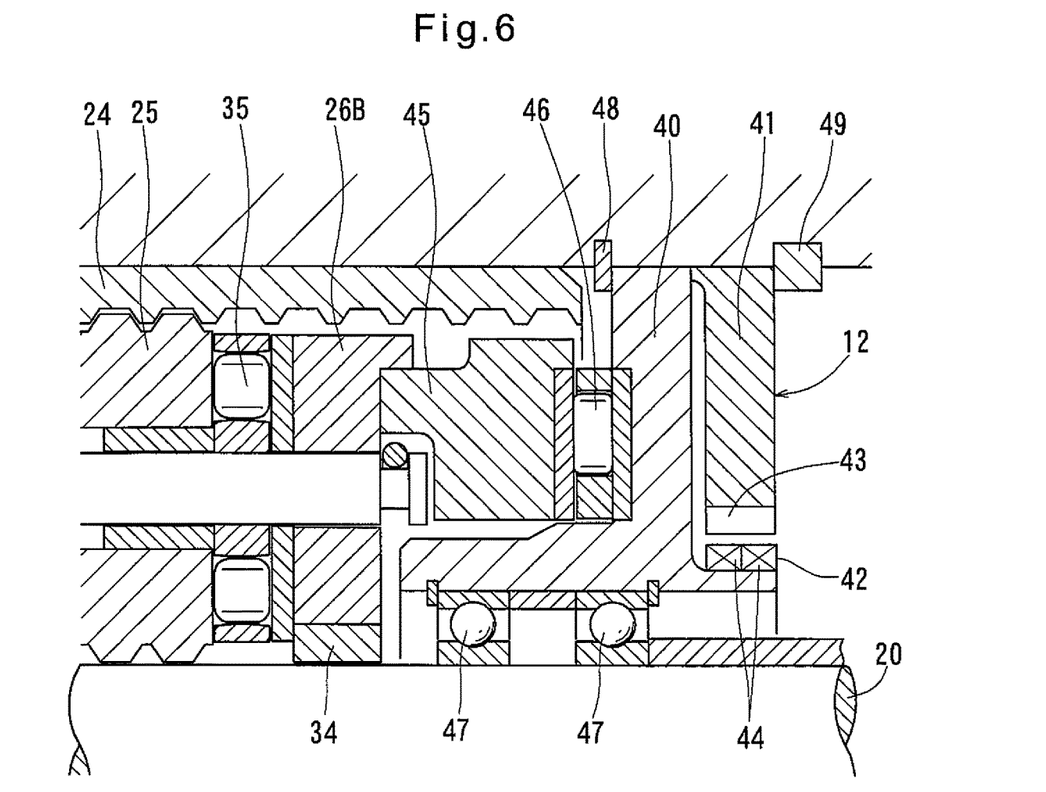
FIG. 6 is an enlarged sectional view illustrating the vicinity of the load sensor of FIG. 4.

The load sensor 12 includes an annular plate-shaped flange member 40 and a supporting member 41 axially opposed to each other, a magnetic target 42 generating a magnetic field, and a magnetic sensor element 43 for detecting the strength of the magnetic field. The magnetic target 42 is fixed to the flange member 40, and the magnetic sensor element 43 is fixed to the supporting member 41. The magnetic target 42 and the magnetic sensor element 43 are opposed to each other such that the output from the magnetic sensor element 43 changes when the flange member 40 is deflected under an axial load applied to the flange member 40. As illustrated in FIG. 6, the magnetic target 42 is constituted by two permanent magnets 44 magnetized in a direction orthogonal to the direction in which the magnetic target 42 and the magnetic sensor element 43 are displaced relative to each other, and arranged such that the north pole of one of the two permanent magnets 44 is adjacent to the south pole of the other permanent magnet 44. The magnetic sensor element 43 is arranged in the vicinity of the boundary between the adjacent magnetic poles of the respective two permanent magnets 44, constituting the magnetic target 42.

The electric linear motion actuator 1 further includes, between the carrier 26 and the flange member 40, a spacer 45 configured to revolve around the rotary shaft 20 together with the carrier 26, and a thrust bearing 46 through which axial load is transmitted between the spacer 45 and the flange member 40. Rolling bearings 47 are incorporated inside the inner periphery of the flange member 40 to rotatably support the rotary shaft 20.

As illustrated in FIG. 4, snap rings 48 and 49 are attached to the inner periphery of the receiving hole 27 to engage, respectively, with the outer peripheral edge of the flange member 40 and with the outer peripheral edge of the supporting member 41, thereby restricting the axially forward and rearward movements of the load sensor 12. This load sensor 12 axially supports the carrier body 26B through the spacer 45 and the thrust bearing 46, thereby restricting the axially rearward movement of the carrier 26. Also, a snap ring 50 attached to the axially front end of the rotary shaft 20 restricts the axially forward movement of the carrier 26. Namely, both of the axially forward and rearward movements of the carrier 26 are restricted, and since the planetary rollers 25 are retained by the carrier 26, the axially forward and rearward movements of the respective planetary rollers 25 are also kept restricted.

In the above motion conversion mechanism 11, when torque is input to the rotary shaft 20 from the electric motor 10, the planetary rollers 25 revolve around the rotary shaft 20, while rotating about the respective carrier pins 26A. At this time, though the outer ring member 24 and the planetary rollers 25 move in the axial direction relative to each other due to the engagement of the helical rib 30 in the circumferential grooves 31, since the axial movements of the respective planetary rollers 25 as well as the carrier 26 are restricted, the planetary rollers 25 do not move in the axial direction, so that only the outer ring member 24 moves in the axial direction. In this way, the motion conversion mechanism 11 converts the torque of the electric motor 10 to the axial linear driving force of the outer ring member 24, and the friction pad 7 is pressed against the brake disk 2 by the outer ring member 24, thereby applying pressing force to the brake disk 2. At this time, the outer ring member 24 receives an axial reaction force from the brake disk 2 through the friction pad 7, and this reaction force is transmitted to the flange member 40 through the planetary rollers 25, the carrier 26, the spacer 45, and the thrust bearing 46. As a result thereof, the flange member 40 is deflected axially rearwardly by the reaction force, so that the magnetic target 42 and the magnetic sensor element 43 are displaced relative to each other. The output signal from the magnetic sensor element 43 changes according to this relative displacement, thus making it possible to detect the magnitude of the pressing force applied to the break disk 2 on the basis of the output signal from the magnetic sensor element 43.

Figure 7:
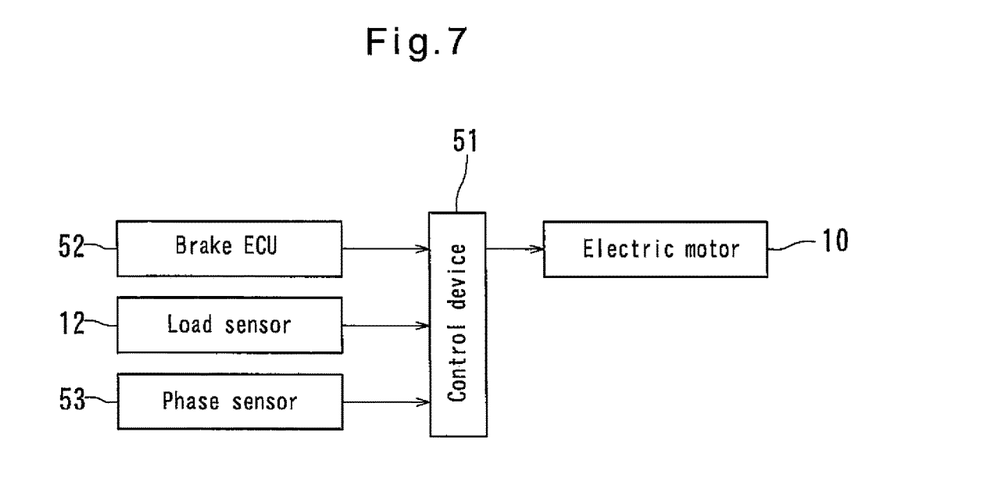
FIG. 7 is a block diagram of a motor control device which controls the electric current applied to the electric motor illustrated in FIG. 1.

The electric motor 10 is connected to a motor control device 51 illustrated in FIG. 7. The motor control device 51 controls the driving electric current applied to the electric motor 10 on the basis of the magnitude of the pressing force detected by the load sensor 12. The motor control device 51 is configured to receive a load command value F from a brake ECU 52, a signal indicative of the magnitude of the pressing force from the load sensor 12, and a signal indicative of the rotation phase of the rotor 13 of the electric motor 10 from a phase sensor 53. The brake ECU 52 is an electronic control unit configured to control the above-described electric brake system and an additional similar electric brake system or systems mounted to other vehicle wheels, on the basis of, for example, how much the driver of the vehicle operates the brake pedal. The phase sensor 53 is, for example, a power supply unit which estimates the rotation phase of the rotor 13 on the basis of the line voltage between lines through which electric power is supplied to the electric motor 10. Alternatively, the phase sensor 53 may be a resolver or a hall element incorporated in the electric motor 10.

In the electric brake system, by applying an electric current to the electric motor 10, a pressing force is applied to the brake disk 2 from the outer ring member 24, and thereafter, by continuing to apply a constant electric current to the electric motor 10, the pressing force applied to the brake disk 2 can be kept constant. If the electric current applied to the electric motor 10 at this time can be reduced, it is possible to effectively reduce the power consumption of the electric motor 10.

In this electric brake system, in order to reduce the power consumption of the electric motor 10, when the pressing force applied to the brake disk 2 is maintained, the electric current applied to the electric motor 10 is controlled taking into account the hysteresis property of the motion conversion mechanism 11. This control is described below in detail.

Hysteresis occurs in the motion conversion mechanism 11 when the pressing force applied to the brake disk 2 from the outer ring member 24 changes. Hysteresis is a phenomenon in which when the pressing force applied to the brake disk 2 from the outer ring member 24 while the torque of the electric motor 10 is increasing is identical in magnitude to the pressing force while the torque of the electric motor 10 is decreasing, the torque of the electric motor 10 necessary to generate the former pressing force is not identical in magnitude to, but is larger in magnitude than, the torque necessary to generate the latter pressing force. Such hysteresis mainly arises from the frictional forces generated in the motion conversion mechanism 11.

Taking this into account, the above motor control device 51 is configured to control the electric current applied to the electric motor 10 when the pressing force applied to the brake disk 2 is to be maintained, such that, first, the torque of the electric motor 10 increases until the pressing force detected by the load sensor 12 reaches a predetermined value larger than a target value, and then the torque of the electric motor 10 decreases until the pressing force detected by the load sensor 12 reaches the target value.

Figure 8:
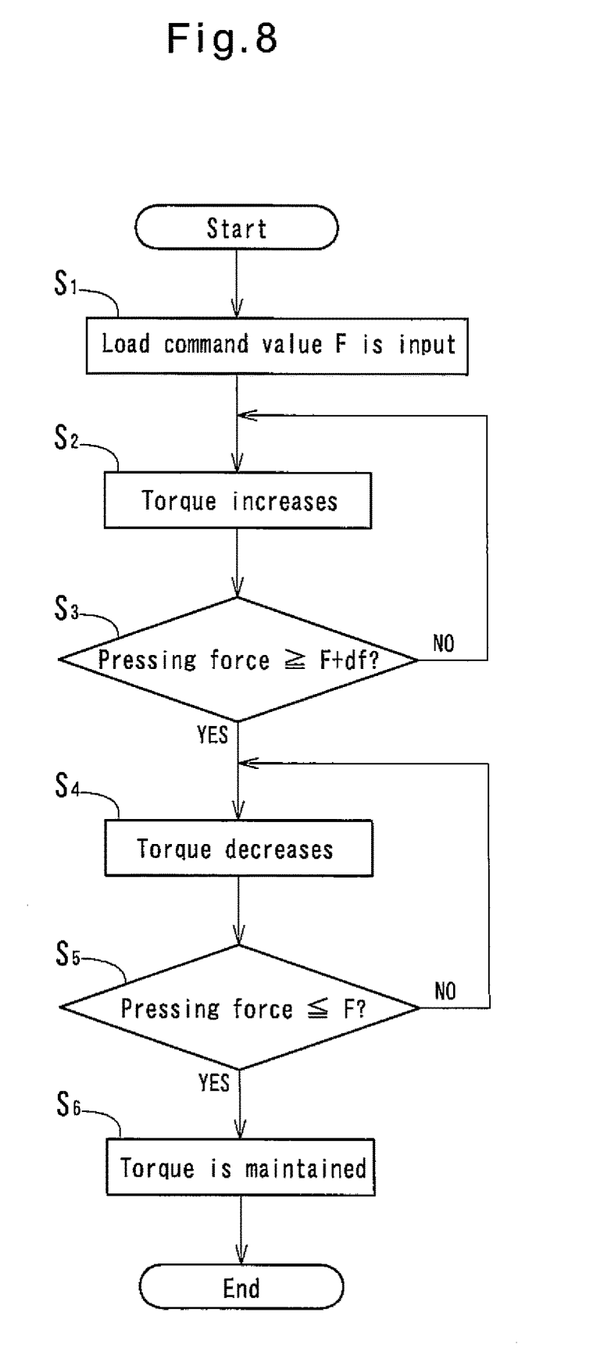
FIG. 8 is a flow chart illustrating an example of the control performed by the motor control device illustrated in FIG. 7.

For example, as illustrated in FIG. 8, the motor control device 51 is configured to control the electric current applied to the electric motor 10 when the load command value F is input to the motor control device 51 from the brake ECU 52 (step $S_1$), such that, first, the torque of the electric motor 10 increases until the pressing force detected by the load sensor 12 reaches a value (F+df), i.e. a value larger than the load command value F by a predetermined offset value df (steps $S_2$ and $S_3$), second, the torque of the electric motor 10 decreases until the pressing force detected by the load sensor 12 reaches the load command value F (steps $S_4$ and $S_5$), and third, the torque of the electric motor 10 is maintained (step $S_6$). The offset value df is a predetermined minute value sufficiently small compared to the load command value F.

Figure 10:
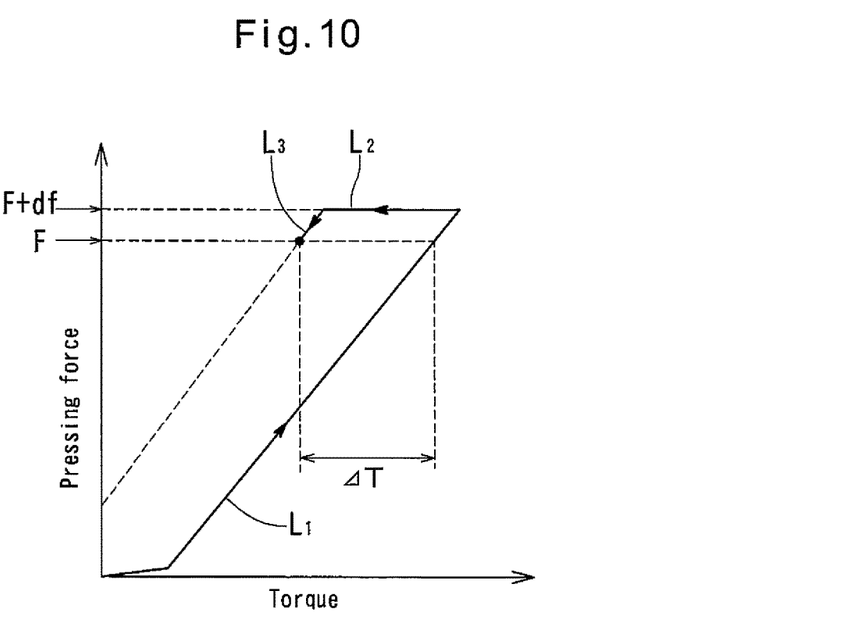
FIG. 10 is a graph illustrating the correspondence relation between the torque of the electric motor and the pressing force applied to a brake disk when the electric current applied to the electric motor is controlled in accordance with the control flow illustrated in FIG. 8.

By controlling in this way, it is possible to reduce the power consumption of the electric motor 10. Namely, as illustrated in FIG. 10, when the torque of the electric motor 10 is increased from zero, pressing force increases along a straight line $L_1$ showing positive efficiency. When the torque of the electric motor 10 begins to decrease thereafter, non-linear hysteresis shown by straight line $L_2$ occurs, in which the pressing force hardly changes until the torque of the electric motor 10 reaches straight line $L_3$ showing reverse efficiency. When the torque of the electric motor 10 is further reduced, the pressing force decreases along straight line $L_3$. The torque of the electric motor 10 when the pressing force has reached the load command value F while the torque is decreasing as shown by straight line $L_3$, is not identical in magnitude to, but is smaller in magnitude by $\Delta T$ than, the torque of the electric motor 10 when the pressing force has reached the same load command value F while the torque is increasing as shown by straight line $L_1$ (due to the hysteresis property of the motion conversion mechanism 11). Therefore, by controlling the electric current applied to the electric motor 10 such that the pressing force reaches the load command value F while the torque of the electric motor 10 is decreasing as shown by straight line $L_3$, it is possible to keep the torque of the electric motor 10 small when the pressing force is at the load command value F (target value), and thus to reduce the power consumption of the electric motor 10 necessary for maintaining the pressing force thereafter.

It is preferable that the motor control device 51 controls the electric current applied to the electric motor 10 when the pressing force detected by the load sensor 12 is maintained at the load command value F, such that the rotor 13 stops, among the above-mentioned first rotation phases of the rotor 13, at which the torque generated in the rotor 13 becomes maximum during one rotation of the rotor 13 relative to the stator 14, at the rotation phase which is the closest to the rotation phase where the pressing force coincides with the load command value F. Namely, when reducing the torque of the electric motor 10 to reduce the pressing force detected by the load sensor 12 toward the load command value F, the motor control device 51 controls the driving electric current applied to the electric motor 10 such that the rotor 13 stops not at the rotation phase where the pressing force detected by the load sensor 12 completely coincides with the load command value F, but at one of the first rotation phases closest to the rotation phase where the pressing force coincides with the load command value F. By controlling in this way, after pressing force is applied to the brake disk 2, it is possible to stably maintain the magnitude of this pressing force.

The above control by which the rotor 13 is stopped at one of the first rotation phases may be performed only if the load command value F is larger than a predetermined threshold value. By doing so, even if the load command value F is relatively small, it is possible to obtain stable pressing force.

Figure 9:
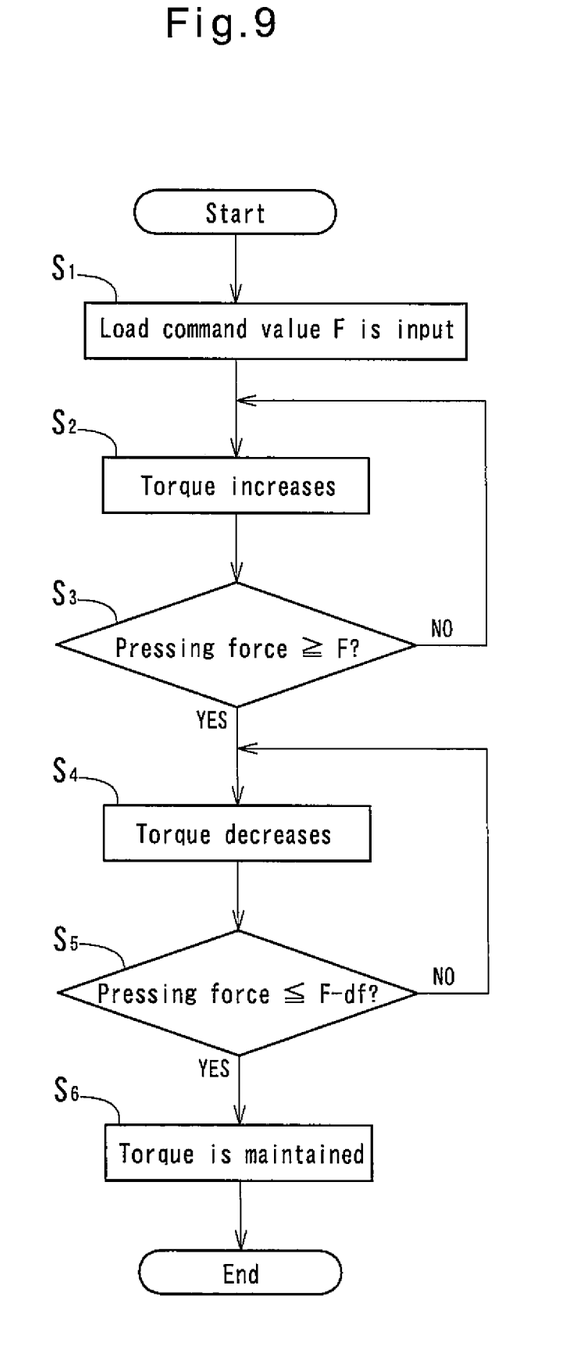
FIG. 9 is a flow chart illustrating another example of the control performed by the motor control device illustrated in FIG. 7.

Alternatively, as illustrated in FIG. 9, the motor control device 51 may be configured to control the electric current applied to the electric motor 10 when the load command value F is input to the motor control device 51 from the brake ECU 52 (step $S_1$), such that, first, the torque of the electric motor 10 increases until the pressing force detected by the load sensor 12 reaches the load command value F (steps $S_2$ and $S_3$), second, the torque of the electric motor 10 decreases until the pressing force detected by the load sensor 12 reaches a value (F−df), i.e. a value smaller by a predetermined offset value df than the load command value F (steps $S_4$ and $S_5$), and third, the torque of the electric motor 10 is maintained (step $S_6$).

Figure 11:
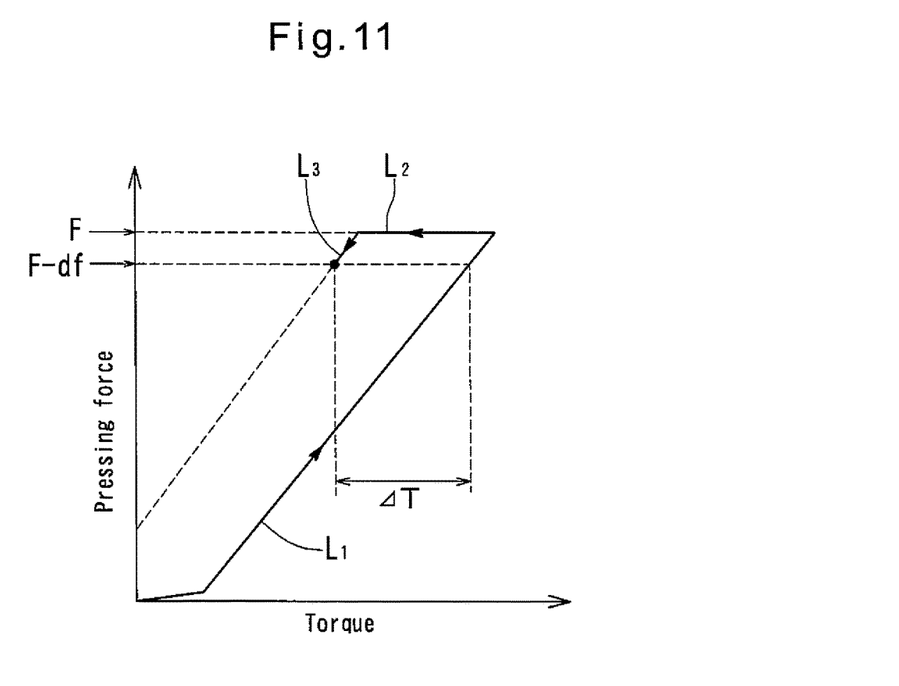
FIG. 11 is a graph illustrating the correspondence relation between the torque of the electric motor and the pressing force applied to the brake disk when the electric current applied to the electric motor is controlled in accordance with the control flow illustrated in FIG. 9.

By also controlling the electric current applied to the electric motor 10 in this way, as illustrated in FIG. 11, the torque of the electric motor 10 when the pressing force has reached the target value (F−df) while the torque is decreasing along straight line $L_3$, is not identical in magnitude to, but is smaller in magnitude by $\Delta T$ than, the torque when the pressing force has reached the same target value (F−df) while the torque is increasing along straight line $L_1$ (due to the hysteresis property of the motion conversion mechanism 11). Therefore, as described above, by controlling the electric current applied to the electric motor 10 such that the pressing force reaches the target value (F−df) while the torque of the electric motor 10 is decreasing along straight line $L_3$, it is possible to keep the torque of the electric motor 10 small when the pressing force is at the target value (F−df), and thus to reduce the power consumption of the electric motor 10 necessary for maintaining the pressing force thereafter.

In this case too, it is preferable that the motor control device 51 controls the electric current applied to the electric motor 10 when the pressing force detected by the load sensor 12 is to be maintained at the target value, which is smaller by the predetermined offset value df than the load command value F, such that the rotor 13 stops at one of the first rotation phases of the rotor 13 closest to the rotation phase where the pressing force coincides with the target value (F−df). By controlling in this way, after pressing force is applied to the brake disk 2, it is possible to stably maintain the magnitude of this pressing force.

The above control by which the rotor 13 is stopped at one of the first rotation phases may be performed only if the target value (F−df) of the pressing force is larger than a predetermined threshold value. By doing so, even if the target value of the pressing force is relatively small, it is possible to obtain stable pressing force.

In the above-described electric brake system, when the pressing force applied to the brake disk 2 is to be maintained at the target value, since the electric current applied to the electric motor 10 is controlled such that the pressing force reaches the target value while the torque of the electric motor 10 is decreasing along straight line $L_3$, the torque of the electric motor 10 when the pressing force has reached the target value is small compared to the normal control by which the pressing force reaches the target value while the torque of the electric motor 10 is increasing along straight line $L_1$. Therefore, it is possible to reduce the electric current applied to the electric motor 10 for maintaining the pressing force at the target value, and thus to reduce the power consumption of the electric motor 10.

In the above embodiment, as the motion conversion mechanism 11 in which the torque of the electric motor 10 is converted to the linear motion force of the linear motion member (outer ring member 24), a planetary roller mechanism is used which includes a rotary shaft 20 to which the torque of the electric motor 10 is input, planetary rollers 25 kept in rolling contact with the cylindrical surface of the outer periphery of the rotary shaft 20, an outer ring member 24 arranged so as to surround the planetary rollers 25, a helical rib 30 formed on the inner periphery of the outer ring member 24, and helical grooves or circumferential grooves 31 formed in the outer peripheries of the planetary rollers 25 such that the helical rib 30 engages in the helical grooves or the circumferential grooves 31. In this arrangement, since the axial movement of the linear motion member (outer ring member 24) generated when the rotary shaft 20 rotates once is small so that the planetary roller mechanism functions as a speed reduction mechanism, the hysteresis property is shown to a considerable degree in the planetary roller mechanism. As a result thereof, by applying the above control to the electric brake system in which the planetary roller mechanism is used, it is possible to effectively reduce the power consumption of the electric motor 10.

The above motor control device 51 can control the electric current applied to the electric motor 10 such that the work that the torque generated in the electric motor 10 increases and then decreases is performed at predetermined time intervals. On the basis of the correspondence relation between the magnitude of the pressing force detected by the load sensor 12 at this time and the amount of the electric current applied to the electric motor 10, the motor control device 51 can calculate the correspondence relation (positive efficiency) between the electric current applied to the electric motor 10 when the torque generated in the electric motor 10 increases and the pressing force applied to the brake disk 2 at this time, and the correspondence relation (reverse efficiency) between the electric current applied to the electric motor 10 when the torque generated in the electric motor 10 decreases and the pressing force applied to the brake disk 2 at this time, and can remember the correspondence relations. Furthermore, the motor control device 51 can control the electric current applied to the electric motor 10 on the basis of the respective correspondence relations remembered by the electric motor 10. The calculation and remembrance of the positive efficiency and the reverse efficiency by the motor control device 51 may be performed right after the motor control device 51 is turned on.

The electric linear motion actuator of the above embodiment includes a planetary roller mechanism as the motion conversion mechanism 11 for converting the torque of the electric motor 10 to the linear driving force of the linear motion member (outer ring member 24). However, the present invention may also be applied to an electric linear motion actuator including a different motion conversion mechanism 11 (such as a sliding screw mechanism, a ball screw mechanism, or ball-ramp mechanism). Especially if the above-described planetary roller mechanism or the below-described sliding screw mechanism is used as the motion conversion mechanism 11, it is possible to effectively reduce the power consumption of the electric motor 10.

Figure 12:
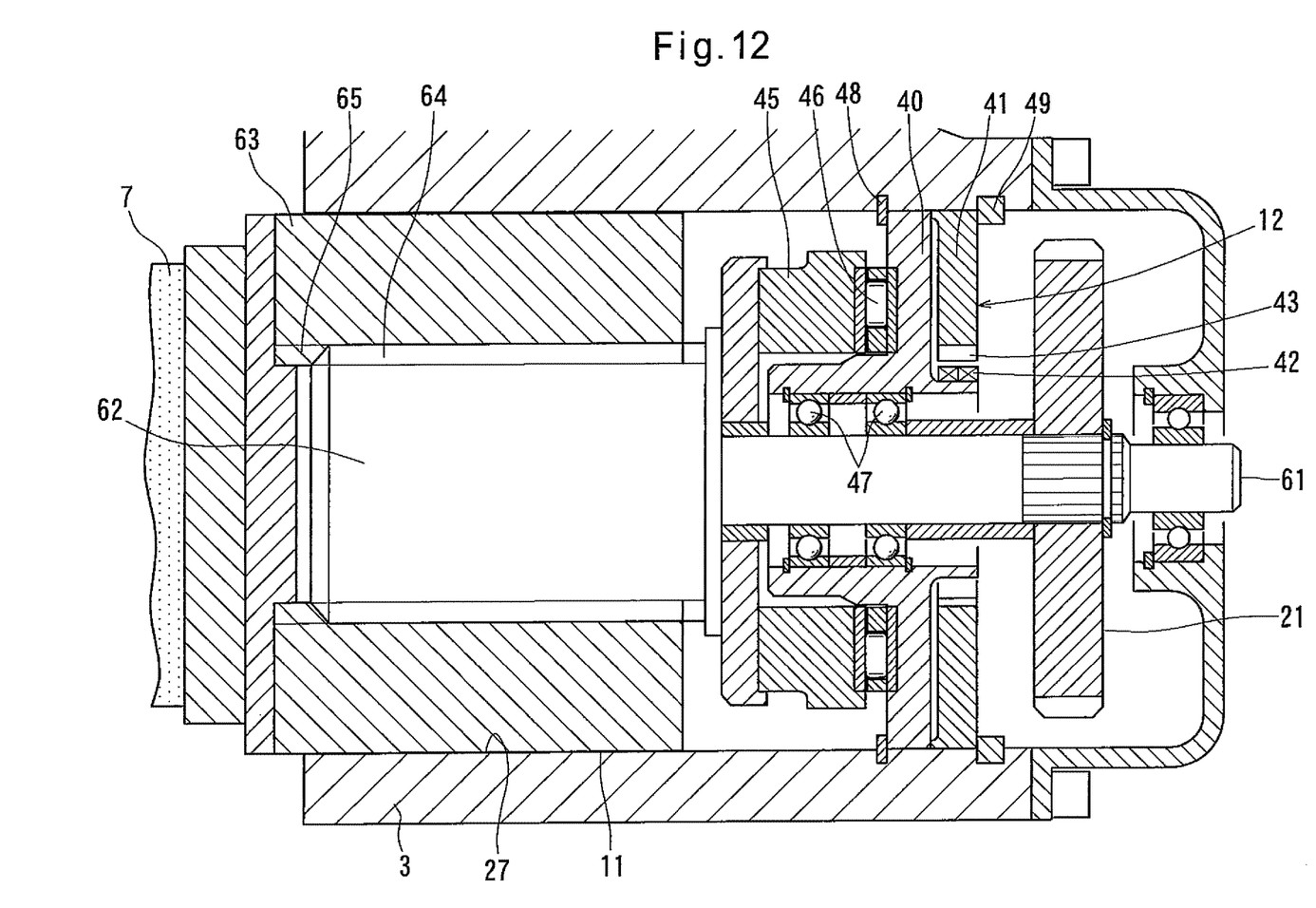
FIG. 12 is an enlarged sectional view of an electric linear motion actuator in which a sliding screw mechanism is used as a motion conversion mechanism.

FIG. 12 illustrates an electric linear motion actuator in which a sliding screw mechanism is used as the motion conversion mechanism 11. Hereinafter, elements corresponding to those of the above embodiment are denoted by identical numerals, and their description is omitted.

The electric linear motion actuator of FIG. 12 includes a rotary shaft 61 to which the torque of the electric motor 10 is input, a threaded shaft 62 configured to rotate together with the rotary shaft 61, a nut 63 kept in threaded engagement with the threaded shaft 62, and the load sensor 12 arranged axially rearward of the nut 63. The threaded shaft 62 is a shaft member formed on its outer periphery with an external thread 64. The nut 63 is a tubular member formed on its inner periphery with an internal thread 65. The external thread 64 and the internal thread 65 are in frictional contact with each other. The external thread 64 and the internal thread 65 may be, for example, trapezoidal threads each having a trapezoidal section.

The nut 63 is axially slidably received in the receiving hole 27, formed in the opposed piece 3 of the caliper body 6, while rotationally fixed to the caliper body 6. A spacer 45 is provided at the axially rear end of the threaded shaft 62 so as to be rotatable together with the threaded shaft 62, and is supported by the load sensor 12 through a thrust bearing 46. The load sensor 12 restricts the axially rearward movement of the nut 63 by axially supporting the nut 63 through the spacer 45, the thrust bearing 46, and the threaded shaft 62.

In this electric linear motion actuator, by inputting the torque of the electric motor 10 to the rotary shaft 61, the threaded shaft 62 and the nut 63 rotate relative to each other, while the nut 63 moves forward in the axial direction, so that the friction pad 7 is pressed against the brake disk 2 by the nut 63, thereby generating braking force. At this time, the nut 63, which is the linear motion member, receives axially rearward reaction force, and this reaction force is transmitted to the load sensor 12 through the screw shaft 62, the spacer 45, and the thrust bearing 46.

In the electric brake system in which this sliding screw mechanism is used as the motion conversion mechanism 11, by controlling the electric current applied to the electric motor 10 when the pressing force applied to the brake disk 2 is to be maintained, such that, first, the torque of the electric motor 10 increases until the pressing force detected by the load sensor 12 reaches a predetermined value larger than a target value, and then the torque of the electric motor 10 decreases until the pressing force detected by the load sensor 12 reaches the target value, it is possible to reduce the electric current applied to the electric motor 10 so as to maintain the pressing force at the target value, and to thus reduce the power consumption of the electric motor 10.

DESCRIPTION OF REFERENCE NUMERALS

2: brake disk
7: friction pad
10: electric motor
11: motion conversion mechanism
12: load sensor
13: rotor
14: stator
20: rotary shaft
24: outer ring member
25: planetary roller
26: carrier
30: helical rib
31: circumferential groove
51: motor control device
52: brake ECU
53: phase sensor

The invention claimed is:

1. An electric linear motion actuator comprising:
an electric motor configured to generate a torque corresponding to a driving electric current applied to the electric motor;
a motion conversion mechanism configured to convert the torque generated by the electric motor to a linear driving force of a linear motion member such that a pressing force is applied to a target member from the linear motion member;
a load sensor configured to detect a magnitude of the pressing force applied to the target member; and
a motor control device configured to control the driving electric current applied to the electric motor on a basis of the magnitude of the pressing force detected by the load sensor,
wherein the motion conversion mechanism comprises a mechanism showing a hysteresis property by which a magnitude of the torque of the electric motor when the pressing force is of any arbitrary magnitude while the torque is increasing is larger than a magnitude of the torque when the pressing force is of said arbitrary magnitude while the torque is decreasing, and
wherein the motor control device is configured to control the electric current applied to the electric motor when the pressing force applied to the target member is to be maintained, such that the torque of the electric motor increases until the pressing force, as detected by the load sensor, reaches a predetermined value larger than a target value, and then the torque of the electric motor decreases until the pressing force, as detected by the load sensor, reaches the target value.

2. The electric linear motion actuator according to claim 1, wherein the target value comprises a load command value input to the motor control device, and wherein the predetermined value comprises a value larger by a predetermined offset value than the load command value.

3. The electric linear motion actuator according to claim 1, wherein the target value comprises a value smaller by a predetermined offset value than a load command value input to the motor control device, and wherein the predetermined value comprises the load command value.

4. The electric linear motion actuator according to claim 1, wherein the electric motor comprises a rotatably supported rotor, and a stator by which torque is to be generated in the rotor,
wherein the rotor and the stator are configured such that during one rotation of the rotor relative to the stator, the torque generated in the rotor becomes maximum at first rotation phases of the rotor, and the torque generated in the rotor becomes minimum at second rotation phases which are alternate with the first rotation phases,
wherein a phase sensor configured to detect the rotation phase of the rotor is provided, and
wherein the motor control device is configured to perform a phase control in which the driving electric current applied to the electric motor when the pressing force detected by the load sensor is maintained at the target value such that the rotor stops at one of the first rotation phases closest to the rotation phase when the pressing force coincides with the target value.

5. The electric linear motion actuator according to claim 4, wherein the motor control device is configured to perform the phase control only if the target value of the pressing force is larger than a predetermined threshold value.

6. The electric linear motion actuator according to claim 1, wherein the motion conversion mechanism comprises a planetary roller mechanism including:
a rotary shaft to which the torque of the electric motor is to be input;
an outer ring member arranged coaxially with the rotary shaft so as to surround the rotary shaft;
a plurality of planetary rollers kept in contact with an outer periphery of the rotary shaft and with an inner periphery of the outer ring member; and
a carrier retaining the planetary rollers such that the planetary rollers are rotatable about axes of the respective planetary rollers while revolving around the rotary shaft;
wherein a helical rib is formed on the inner periphery of the outer ring member; and
a helical groove or a circumferential groove is formed in an outer periphery of each of the planetary rollers such that the helical rib engages in the helical groove or the circumferential groove.

7. An electric brake system comprising:
a brake disk configured to rotate together with a wheel;
a friction pad; and
an electric linear motion actuator configured to press the friction pad against the brake disk;
wherein the electric linear motion actuator comprises the electric linear motion actuator according to claim 1, and
wherein the target member comprises the brake disk.

8. The electric linear motion actuator according to claim 2, wherein the electric motor comprises a rotatably supported rotor, and a stator by which torque is to be generated in the rotor,
wherein the rotor and the stator are configured such that during one rotation of the rotor relative to the stator, the torque generated in the rotor becomes maximum at first rotation phases of the rotor, and the torque generated in the rotor becomes minimum at second rotation phases which are alternate with the first rotation phases,
wherein a phase sensor configured to detect the rotation phase of the rotor is provided, and
wherein the motor control device is configured to control the driving electric current applied to the electric motor when the pressing force detected by the load sensor is maintained at the target value such that the rotor stops at one of the first rotation phases closest to the rotation phase when the pressing force coincides with the target value.

9. The electric linear motion actuator according to claim 3, wherein the electric motor comprises a rotatably supported rotor, and a stator by which torque is to be generated in the rotor,
wherein the rotor and the stator are configured such that during one rotation of the rotor relative to the stator, the torque generated in the rotor becomes maximum at first rotation phases of the rotor, and the torque generated in the rotor becomes minimum at second rotation phases which are alternate with the first rotation phases,
wherein a phase sensor configured to detect the rotation phase of the rotor is provided, and
wherein the motor control device is configured to control the driving electric current applied to the electric motor when the pressing force detected by the load sensor is maintained at the target value such that the rotor stops at one of the first rotation phases closest to the rotation phase when the pressing force coincides with the target value.

10. The electric linear motion actuator according to claim 2, wherein the motion conversion mechanism comprises a planetary roller mechanism including:
- a rotary shaft to which the torque of the electric motor is to be input;
- an outer ring member arranged coaxially with the rotary shaft so as to surround the rotary shaft;
- a plurality of planetary rollers kept in contact with an outer periphery of the rotary shaft and with an inner periphery of the outer ring member; and
- a carrier retaining the planetary rollers such that the planetary rollers are rotatable about axes of the respective planetary rollers while revolving around the rotary shaft;
- wherein a helical rib is formed on the inner periphery of the outer ring member; and
  - a helical groove or a circumferential groove is formed in an outer periphery of each of the planetary rollers such that the helical rib engages in the helical groove or the circumferential groove.

11. The electric linear motion actuator according to claim 3, wherein the motion conversion mechanism comprises a planetary roller mechanism including:
- a rotary shaft to which the torque of the electric motor is to be input;
- an outer ring member arranged coaxially with the rotary shaft so as to surround the rotary shaft;
- a plurality of planetary rollers kept in contact with an outer periphery of the rotary shaft and with an inner periphery of the outer ring member; and
- a carrier retaining the planetary rollers such that the planetary rollers are rotatable about axes of the respective planetary rollers while revolving around the rotary shaft;
- wherein a helical rib is formed on the inner periphery of the outer ring member; and
  - a helical groove or a circumferential groove is formed in an outer periphery of each of the planetary rollers such that the helical rib engages in the helical groove or the circumferential groove.

12. The electric linear motion actuator according to claim 4, wherein the motion conversion mechanism comprises a planetary roller mechanism including:
- a rotary shaft to which the torque of the electric motor is to be input;
- an outer ring member arranged coaxially with the rotary shaft so as to surround the rotary shaft;
- a plurality of planetary rollers kept in contact with an outer periphery of the rotary shaft and with an inner periphery of the outer ring member; and
- a carrier retaining the planetary rollers such that the planetary rollers are rotatable about axes of the respective planetary rollers while revolving around the rotary shaft;
- wherein a helical rib is formed on the inner periphery of the outer ring member; and
  - a helical groove or a circumferential groove is formed in an outer periphery of each of the planetary rollers such that the helical rib engages in the helical groove or the circumferential groove.

13. The electric linear motion actuator according to claim 5, wherein the motion conversion mechanism comprises a planetary roller mechanism including:
- a rotary shaft to which the torque of the electric motor is to be input;
- an outer ring member arranged coaxially with the rotary shaft so as to surround the rotary shaft;
- a plurality of planetary rollers kept in contact with an outer periphery of the rotary shaft and with an inner periphery of the outer ring member; and
- a carrier retaining the planetary rollers such that the planetary rollers are rotatable about axes of the respective planetary rollers while revolving around the rotary shaft;
- wherein a helical rib is formed on the inner periphery of the outer ring member; and
  - a helical groove or a circumferential groove is formed in an outer periphery of each of the planetary rollers such that the helical rib engages in the helical groove or the circumferential groove.

14. An electric brake system comprising:
a brake disk configured to rotate together with a wheel;
a friction pad; and
an electric linear motion actuator configured to press the friction pad against the brake disk;
wherein the electric linear motion actuator comprises the electric linear motion actuator according to claim 2, and
wherein the target member comprises the brake disk.

15. An electric brake system comprising:
a brake disk configured to rotate together with a wheel;
a friction pad; and
an electric linear motion actuator configured to press the friction pad against the brake disk;
wherein the electric linear motion actuator comprises the electric linear motion actuator according to claim 3, and
wherein the target member comprises the brake disk.

16. An electric brake system comprising:
a brake disk configured to rotate together with a wheel;
a friction pad; and
an electric linear motion actuator configured to press the friction pad against the brake disk;
wherein the electric linear motion actuator comprises the electric linear motion actuator according to claim 4, and
wherein the target member comprises the brake disk.

17. An electric brake system comprising:
a brake disk configured to rotate together with a wheel;
a friction pad; and
an electric linear motion actuator configured to press the friction pad against the brake disk;
wherein the electric linear motion actuator comprises the electric linear motion actuator according to claim 5, and
wherein the target member comprises the brake disk.

18. An electric brake system comprising:
a brake disk configured to rotate together with a wheel;
a friction pad; and
an electric linear motion actuator configured to press the friction pad against the brake disk;
wherein the electric linear motion actuator comprises the electric linear motion actuator according to claim 6, and
wherein the target member comprises the brake disk.

* * * * *